(12) United States Patent
Asano et al.

(10) Patent No.: US 10,541,085 B2
(45) Date of Patent: *Jan. 21, 2020

(54) MULTILAYER CERAMIC ELECTRONIC COMPONENT INCLUDING AN ORGANIC LAYER

(71) Applicant: Murata Manufacturing Co., Ltd., Nagaokakyo-shi, Kyoto-fu (JP)

(72) Inventors: Hiroshi Asano, Nagaokakyo (JP); Nobuyasu Hamamori, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 122 days.

This patent is subject to a terminal disclaimer.

(21) Appl. No.: 15/708,474

(22) Filed: Sep. 19, 2017

(65) Prior Publication Data
US 2018/0082788 A1    Mar. 22, 2018

(30) Foreign Application Priority Data

Sep. 20, 2016    (JP) ................. 2016-183315

(51) Int. Cl.
*H01G 4/224* (2006.01)
*H01G 4/232* (2006.01)
(Continued)

(52) U.S. Cl.
CPC .......... *H01G 4/224* (2013.01); *H01G 4/005* (2013.01); *H01G 4/232* (2013.01); *H01G 4/30* (2013.01); *H01G 4/12* (2013.01)

(58) Field of Classification Search
CPC ........ H01G 4/2325; H01G 4/232; H01G 4/14; H01G 4/12; H01G 4/005; H01G 4/30
See application file for complete search history.

(56) References Cited

U.S. PATENT DOCUMENTS 8,988,850 B1* 3/2015 Kodama ............... H01G 4/232
                                                            361/301.4
10,121,595 B2* 11/2018 Hamamori ............ H01G 4/005
(Continued)

FOREIGN PATENT DOCUMENTS

JP    2010027730 A  *  2/2010
JP    2010-109238 A     5/2010
(Continued)

OTHER PUBLICATIONS

Asano et al., "Multilayer Ceramic Electronic Component," U.S Appl. No. 15/708,462, filed Sep. 19, 2017.
(Continued)

Primary Examiner — David M Sinclair
(74) Attorney, Agent, or Firm — Keating & Bennet, LLP (57) ABSTRACT

In a multilayer ceramic electronic component, a first organic layer covers from a first base electrode layer to at least a portion of the surface of a laminated body, and a second organic layer covers from a second base electrode layer to at least a portion of the surface of the laminated body, and a first plating layer includes a leading end in contact with the first organic layer, with the first organic layer of about 5 nm or more and about 500 nm or less in thickness at an end of the first base electrode layer, and a second plating layer has a leading end in contact with the second organic layer, with the second organic layer of about 5 nm or more and about 500 nm or less in thickness at an end of the second base electrode layer.

16 Claims, 4 Drawing Sheets

(51) Int. Cl.
*H01G 4/30* (2006.01)
*H01G 4/005* (2006.01)
*H01G 4/12* (2006.01)

(56) References Cited

U.S. PATENT DOCUMENTS

| | | | |
|---|---|---|---|
| 2008/0151470 A1* | 6/2008 | Motoki | H01G 4/0085 361/303 |
| 2010/0290172 A1* | 11/2010 | Motoki | H01G 4/232 361/305 |
| 2010/0302704 A1* | 12/2010 | Ogawa | H01G 4/2325 361/306.3 |
| 2011/0273056 A1 | 11/2011 | Mizuno et al. | |
| 2012/0188682 A1* | 7/2012 | Sato | H01G 4/232 361/305 |
| 2015/0115776 A1* | 4/2015 | Terashita | H01C 7/008 310/365 |
| 2016/0042864 A1* | 2/2016 | Hong | H01G 4/30 361/301.4 |
| 2018/0082785 A1* | 3/2018 | Asano | H01G 4/005 |
| 2018/0082788 A1* | 3/2018 | Asano | H01G 4/005 |
| 2018/0082789 A1* | 3/2018 | Asano | H01G 2/10 |

FOREIGN PATENT DOCUMENTS

| | | |
|---|---|---|
| JP | 2015-198236 A | 11/2015 |
| WO | 2010/073493 A1 | 7/2010 |

OTHER PUBLICATIONS

Asano et al., "Multilayer Ceramic Electronic Component," U.S Appl. No. 15/708,464, filed Sep. 19, 2017.
Hamamori et al., "Multilayer Ceramic Electronic Component," U.S Appl. No. 15/708,469, filed Sep. 19, 2017.
Asano et al., "Multilayer Ceramic Electronic Component and Manufacturing Method Therefor," U.S Appl. No. 15/708,476, filed Sep. 19, 2017.

* cited by examiner

MULTILAYER CERAMIC ELECTRONIC COMPONENT INCLUDING AN ORGANIC LAYER

CROSS REFERENCE TO RELATED APPLICATIONS

This application claims the benefit of priority to Japanese Patent Application No. 2016-183315 filed on Sep. 20, 2016. The entire contents of this application are hereby incorporated herein by reference.

BACKGROUND OF THE INVENTION

1. Field of the Invention

The present invention relates to a multilayer ceramic electronic component such as a capacitor, an inductor, and a resistor.

2. Description of the Related Art

Conventionally, multilayer ceramic electronic components such as capacitors, inductors, and resistors have been used for various electronic devices.

In general, these electronic components each have two principal surfaces opposite in the laminating direction, two side surfaces opposite in the width direction perpendicular to the laminating direction, and two end surfaces opposite in the length direction perpendicular to the laminating direction and the width direction.

Two or more external electrodes are provided on the outer surface of the laminated body. The external electrodes are each formed on the end surfaces and portions of the principal surfaces, the end surfaces and portions of the side surfaces, or the end surfaces and portions of the side surfaces and principal surfaces. The external electrodes have a substantially U-shaped or substantially L-shaped cross section in the laminating direction.

Such a multilayer ceramic electronic component is mounted on a substrate by electrically connecting portions of the respective external electrodes, formed mainly on the principal surfaces or the side surfaces, to lands of a substrate with a joint material such as a solder interposed therebetween.

However, when the substrate of the mounted structure is warped by a thermal shock or the like, a stress based on the warp propagates, through the lands, the joint material, and the external electrodes, to the laminated body, thus causing the ceramic portion and the internal electrode portion of the laminated body to have cracks, deformations, or the like generated. As a result, this will cause a decrease in performance or a decrease in reliability in the multilayer ceramic electronic component.

Therefore, Japanese Patent Application Laid-Open No. 2010-109238 discloses wraparound portions of external terminal electrodes respectively provided with leading-end spaced portions spaced from principal surfaces of a ceramic body, in order to prevent the ceramic body from being cracked by the stress mentioned previously.

However, the wraparound portions of the external terminal electrodes in Japanese Patent Application Laid-Open No. 2010-109238 respectively have base end-side joint portions joined to the principal surfaces of the ceramic body. Accordingly, there is concern that the stress will propagate to the ceramic body through the base end-side joint portions and the external terminal electrodes, and it has been difficult to suppress cracks adequately.

SUMMARY OF THE INVENTION

Preferred embodiments of the present invention provide multilayer ceramic electronic components which are able to, when a substrate is warped by a thermal shock or the like with the component mounted on the substrate, significantly reduce or prevent the propagation of a stress based on the warp to a laminated body, thus preventing cracks.

A multilayer ceramic electronic component according to a preferred embodiment of the present invention includes a laminated body including a plurality of laminated dielectric layers and a plurality of laminated internal electrodes, the laminated body including a first principal surface and a second principal surface opposite in a laminating direction, a first side surface and a second side surface opposite in a width direction perpendicular or substantially perpendicular to the laminating direction, and a first end surface and a second end surface opposite in a length direction perpendicular or substantially perpendicular to the laminating direction and the width direction; a first external electrode electrically connected to the internal electrodes, and located on the first end surface, with an end extending on the first principal surface, the second principal surface, the first side surface, and the second side surface; and a second external electrode electrically connected to the internal electrodes, and located on the second end surface, with an end extending on the first principal surface, the second principal surface, the first side surface, and the second side surface, the first external electrode including a first base electrode layer including a conductive metal and a glass component, a first organic layer including an organic silicon compound, covering the first base electrode layer, and a first plating layer located on the first organic layer, the second external electrode including a second base electrode layer including a conductive metal and a glass component, a second organic layer including an organic silicon compound, covering the second base electrode layer, and a second plating layer located on the second organic layer, the first organic layer covering from the first base electrode layer to at least a portion of the surface of the laminated body, and the second organic layer covers from the second base electrode layer to at least a portion of a surface of the laminated body, and a leading end of the first plating layer in contact with the first organic layer, with the first organic layer of about 5 nm or more and about 500 nm or less in thickness at an end of the first base electrode layer, and a leading end of the second plating layer in contact with the second organic layer, with the second organic layer of about 5 nm or more and about 500 nm or less in thickness at an end of the second base electrode layer.

In addition, in a multilayer ceramic electronic component according to a preferred embodiment of the present invention, preferably, an adhesion strength between the laminated body and the first base electrode layer is higher than an adhesion strength between the first organic layer and the first plating layer, and an adhesion strength between the laminated body and the second base electrode layer is higher than an adhesion strength between the second organic layer and the second plating layer.

Furthermore, in a multilayer ceramic electronic component according to a preferred embodiment of the present invention, preferably, for example, an adhesion strength between the laminated body and the first organic layer is higher than the adhesion strength between the first organic layer and the first plating layer, and an adhesion strength between the laminated body and the second organic layer is higher than the adhesion strength between the second organic layer and the second plating layer.

In addition, in a multilayer ceramic electronic component according to a preferred embodiment of the present invention, the first organic layer and the second organic layer each preferably include an organic silicon compound that includes a structure of multifunctional alkoxysilane Si—$(C_nH_{2n+1})_3$, and includes an N element.

Furthermore, in a multilayer ceramic electronic component according to a preferred embodiment of the present invention, an atomic concentration ratio of Si to Cu is preferably about 1% or more and about 5% or less between a Cu concentration and an Si concentration at the surfaces of the first organic layer and the second organic layer.

In addition, in a multilayer ceramic electronic component according to a preferred embodiment of the present invention, the multilayer ceramic electronic component is preferably a multilayer ceramic capacitor.

In accordance with a multilayer ceramic electronic component according to a preferred embodiment of the present invention, the first organic layer covers from the first base electrode layer to at least a portion of the surface of the laminated body, and the second organic layer covers from the second base electrode layer to at least a portion of the surface of the laminated body, and the first plating layer has a leading end in contact with the first organic layer, with the first organic layer of about 5 nm or more and about 500 nm or less in thickness at an end of the first base electrode layer, and the second plating layer has a leading end in contact with the second organic layer, with the second organic layer of about 5 nm or more and about 500 nm or less in thickness at an end of the second base electrode layer, thus making it possible to significantly reduce or prevent cracks, but also further significantly reduce or prevent defective plating even as well as deviations of multilayer ceramic capacitors. In this regard, the crack is defined as cracking which develops from the outer layer portion toward the internal electrode layer portion with an external electrode end as a starting point.

In addition, in accordance with a multilayer ceramic electronic component according to a preferred embodiment of the present invention, when the adhesion strength between the laminated body and the first base electrode layer is higher than the adhesion strength between the first organic layer and the first plating layer, and the adhesion strength between the laminated body and the second base electrode layer is higher than the adhesion strength between the second organic layer and the second plating layer, defects are further reduced, such as a decrease in the reliability of the multilayer ceramic electronic component.

Furthermore, in accordance with a multilayer ceramic electronic component according to a preferred embodiment of the present invention, when the adhesion strength between the laminated body and the first organic layer is higher than the adhesion strength between the first organic layer and the first plating layer, and the adhesion strength between the laminated body and the second organic layer is higher than the adhesion strength between the second organic layer and the second plating layer, if a substrate is warped by a thermal shock or the like with the multilayer ceramic electronic component mounted on the substrate, a stress based on the warp is able to cause delamination between the first base electrode layer and first plating layer of the first external electrode, and delamination between the second base electrode layer and second plating layer of the second external electrode. Therefore, the stress is further dispersed, thus making it possible to significantly reduce or prevent cracking, deformation, or the like in the ceramic portion and the internal electrode portion of the multilayer ceramic electronic component. As a result, the reliability of the multilayer ceramic electronic component is able to be further significantly improved.

In addition, in accordance with a multilayer ceramic electronic component according to a preferred embodiment of the present invention, when the first organic layer and the second organic layer have an organic silicon compound that has a structure of multifunctional alkoxysilane Si—$(C_nH_{2n+1})_3$ and includes an N element, the layers are reliably provided on the surfaces of the laminated body, the first base electrode layer of the first external electrode, and the like, thus significantly improving the reliability.

Furthermore, in accordance with a multilayer ceramic electronic component according to a preferred embodiment of the present invention, when the atomic concentration ratio of Si to Cu is about 1% or more and about 5% or less between the Cu concentration and the Si concentration at the surfaces of the first organic layer and the second organic layer, cracking, deformation, or the like of the ceramic portion and the internal electrode portion of the multilayer ceramic electronic component are able to be significantly reduced or prevented, and also defective plating as well as deviations of the multilayer ceramic electronic component is able to be significantly reduced or prevented.

According to various preferred embodiments of the invention, the ceramic portion and the internal electrode portion of the laminated body are able to be kept from having any crack, deformation, or the like generated, thus significantly improving the performance and reliability of the multilayer ceramic electronic components.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Multilayer ceramic electronic components according to preferred embodiments of the present invention will be described in detail below with reference to the drawings. It is to be noted that multilayer ceramic capacitors will be described as examples of the multilayer ceramic electronic components in the following preferred embodiments. Further, like or corresponding elements and features are denoted by like symbols in the figures, but the descriptions of the elements and features will not be repeated.

Figure 1:
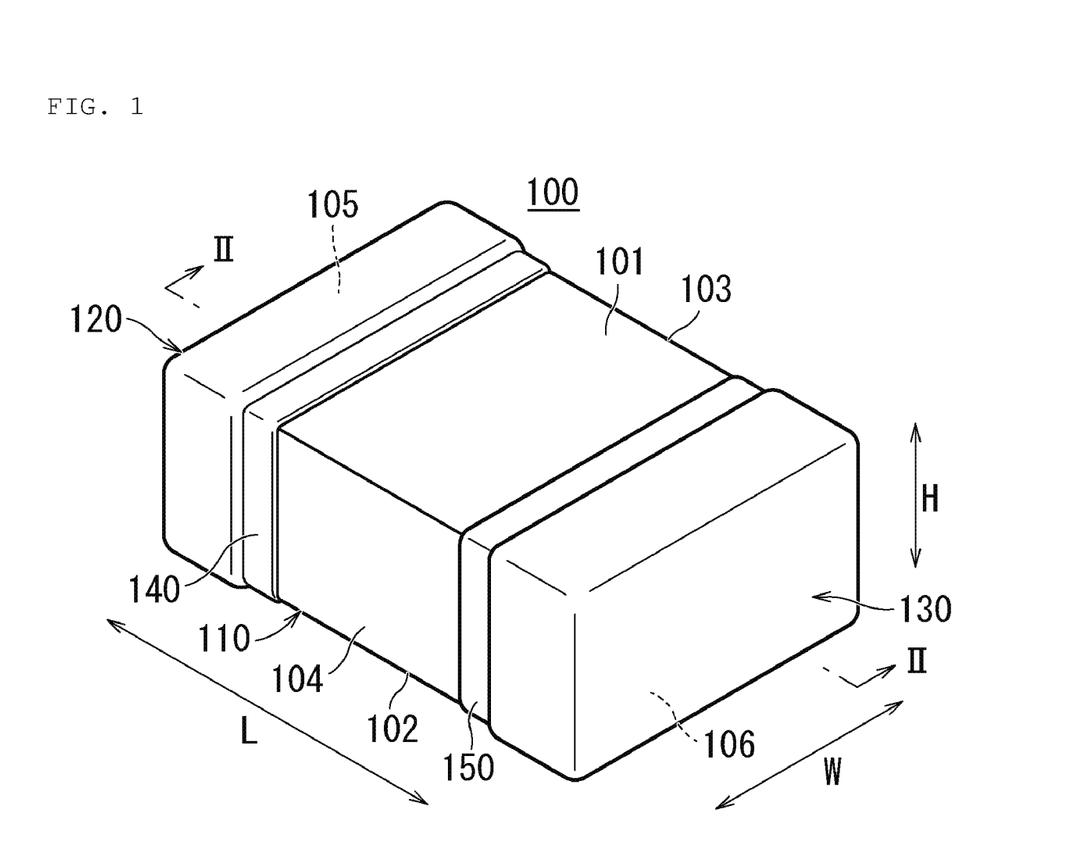
FIG. 1 is a perspective view showing an appearance of a multilayer ceramic electronic component according to a preferred embodiment of the present invention.
Figure 2:
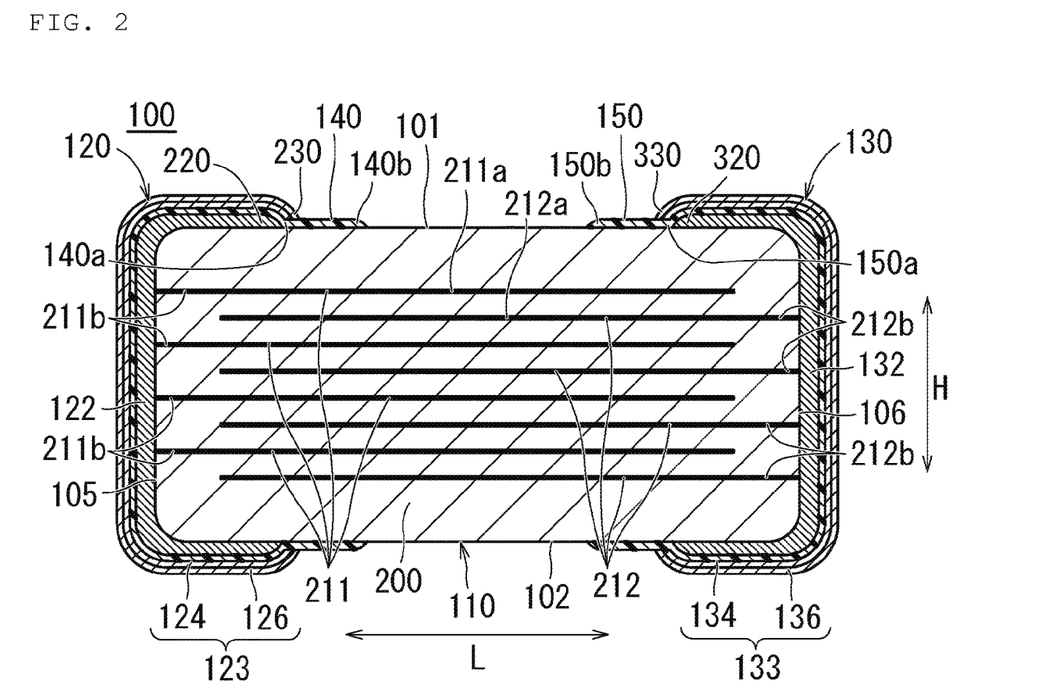
FIG. 2 is a cross-sectional view of the multilayer ceramic electronic component shown in FIG. 1, as viewed from the direction of an arrow along line II-II in FIG. 1.
Figure 3:
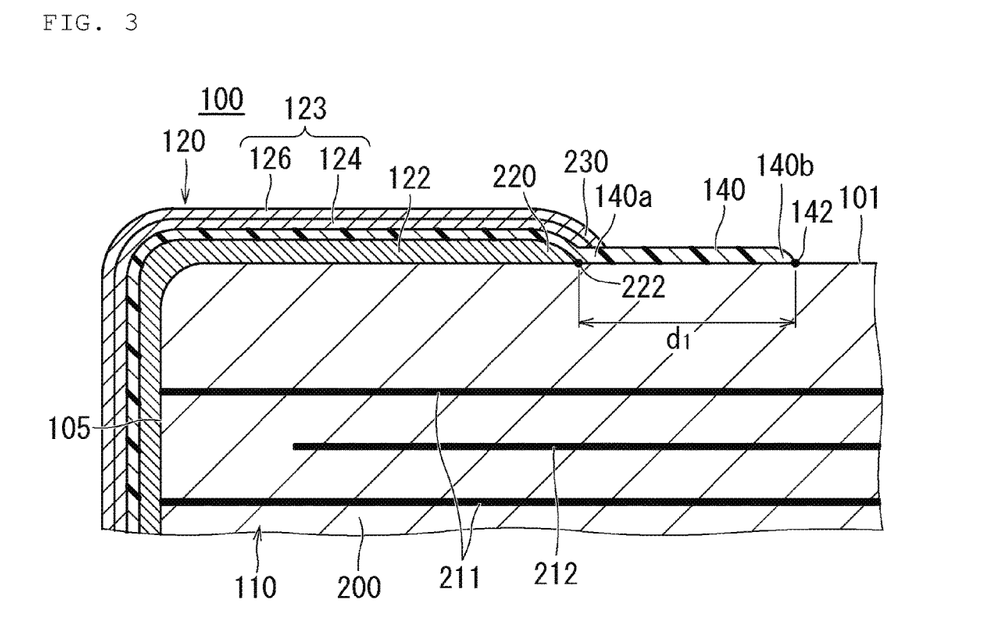
FIG. 3 is a partially enlarged cross-sectional view of an external electrode shown in FIG. 2.
Figure 4:
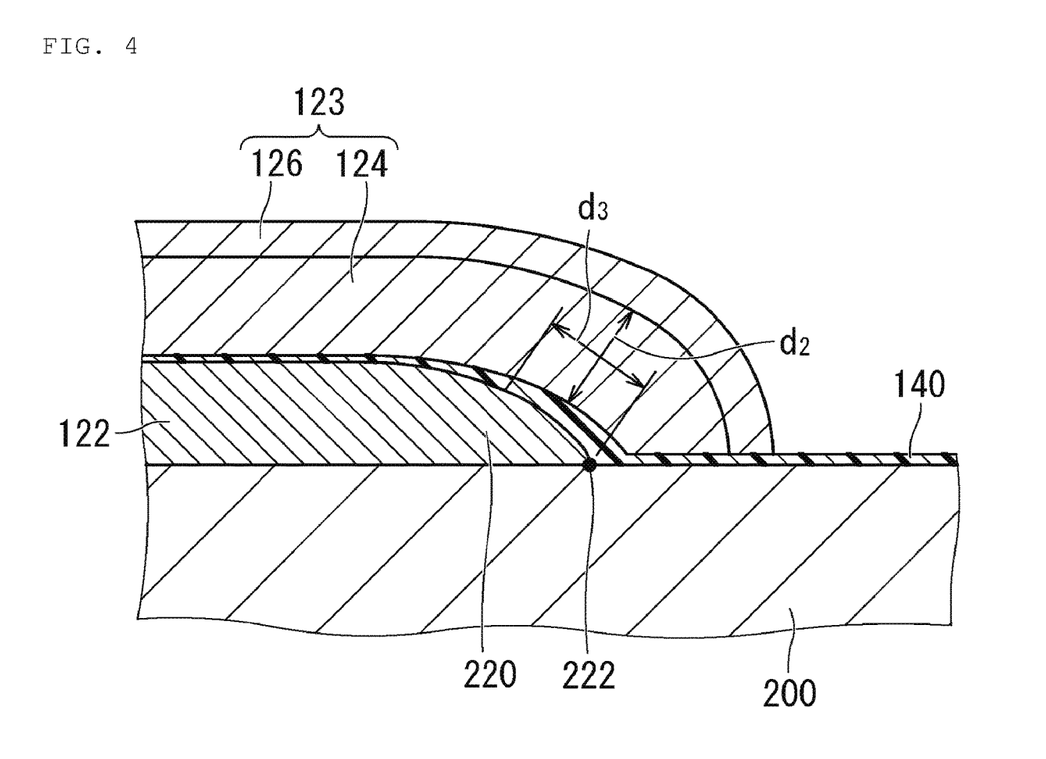
FIG. 4 is a partially enlarged cross-sectional view of a further enlarged portion of the external electrode shown in FIG. 2.

FIG. 1 is a perspective view showing an appearance of a multilayer ceramic capacitor according to a preferred embodiment of the present invention. FIG. 2 is a cross-sectional view of the multilayer ceramic capacitor shown in FIG. 1, as viewed from the direction of an arrow along line II-II in FIG. 1. FIG. 3 is a partially enlarged cross-sectional view of an external electrode shown in FIG. 2. FIG. 4 is a partially enlarged cross-sectional view of a further enlarged portion of the external electrode shown in FIG. 2.

The multilayer ceramic capacitor 100 according to the present preferred embodiment includes a cuboid or substantially cuboid shape, where the dimension in a length direction L is larger than the dimension in a width direction W. The cuboid or substantially cuboid shape encompasses the multilayer ceramic capacitor 100 which includes corners and ridges that are rounded, and the multilayer ceramic capacitor 100 which includes surfaces provided with a difference in level or unevenness.

The multilayer ceramic capacitor 100 includes a laminated body 110, a first external electrode 120, and a second external electrode 130.

The laminated body 110 includes a first principal surface 101 and a second principal surface 102 opposite in the laminating direction H of a plurality of dielectric layers, a first side surface 103 and a second side surface 104 opposite in the width direction W perpendicular or substantially perpendicular to the laminating direction H, and a first end surface 105 and a second end surface 106 opposite in the length direction L perpendicular or substantially perpendicular to both the laminating direction H and the width direction W.

The direction of stacking the dielectric layers of the laminated body 110 is defined as the laminating direction H, the direction of connecting the first external electrode 120 and the second external electrode 130 of the multilayer ceramic capacitor 100, among directions perpendicular or substantially perpendicular to the laminating direction H, is defined as the length direction L of the laminated body 110, and the direction perpendicular or substantially perpendicular to both the laminating direction H and the length direction L is defined as the width direction W of the laminated body 110, and these terms will be referred to in the following description.

The laminated body 110 includes the plurality of dielectric layers 200 and a plurality of internal electrodes that are laminated alternately. The laminated body 110 includes a cuboid or substantially cuboid shape. The laminating direction H of the plurality of dielectric layers 200 and the plurality of internal electrodes corresponds with the height direction.

The laminated body 110 includes a plurality of first internal electrodes 211 and a plurality of second internal electrodes 212 that are arranged alternately in different layers.

The first internal electrodes 211 each includes, as viewed from the laminating direction H, a rectangular or substantially rectangular first opposite portion 211a, and a first extended portion 211b extended from the first opposite portion 211a to the first end surface 105 of the laminated body 110. The first extended portion 211b includes an end surface exposed at the first end surface 105.

The second internal electrodes 212 each includes, as viewed from the laminating direction H, a rectangular or substantially rectangular second opposite portion 212a, and a second extended portion 212b extended from the second opposite portion 212a to the second end surface 106 of the laminated body 110. The second extended portion 212b includes an end surface exposed at the second end surface 106.

As shown in FIG. 2, the first opposite portions 211a of the first internal electrodes 211 and the second opposite portions 212a of the second internal electrodes 212 generate electrostatic capacitance with the dielectric layers 200 interposed therebetween.

The dielectric layers 200 include, for example, a dielectric ceramic material including, as its main component, $BaTiO_3$, $CaTiO_3$, $SrTiO_3$, $CaZrO_3$, $PbTiO_3$, $Pb(Zr,Ti)O_3$, or the like. In addition, the dielectric layers 200 may include, as accessory components, an Mn compound, an Fe compound, a Cr compound, a Co compound, an Ni compound, or the like, for example. The dielectric layers 200 are preferably about 0.5 μm or more and about 10 μm or less in thickness, for example.

The first internal electrodes 211 and the second internal electrodes 212 may include, for example, appropriate conductive materials such as metals, e.g., Ni, Cu, Ag, Pd, or Au, alloys (e.g., Ag—Pd alloys) including at least one of the metals. The first internal electrodes 211 and the second internal electrodes 212 are each preferably about 0.2 μm or more and about 2.0 μm or less in thickness, for example.

The first external electrode 120 is located on the first end surface 105 of the laminated body 110, with ends extending on the first principal surface 101 and the second principal surface 102 as well as the first side surface 103 and the second side surface 104. The first external electrode 120 is electrically connected to the first internal electrodes 211.

The second external electrode 130 is located on the second end surface 106 of the laminated body 110, with ends extending on the first principal surface 101 and the second principal surface 102 as well as the first side surface 103 and the second side surface 104. The second external electrode 130 is electrically connected to the second internal electrodes 212. The first external electrode 120 and the second external electrode 130 are spaced from each other in the length direction L of the laminated body 110.

The first external electrode 120 includes a first base electrode layer 122 including a conductive metal and a glass component, a first organic layer 140 including an organic silicon compound, covering the first base electrode layer 122, and a first plating layer 123 located on the first organic layer 140. The second external electrode 130 includes a second base electrode layer 132 including a conductive metal and a glass component, a second organic layer 150 including an organic silicon compound, covering the second base electrode layer 132, and a second plating layer 133 located on the second organic layer 150.

The first base electrode layer 122 is located on the first end surface 105 of the laminated body 110, and includes ends that extend on the first principal surface 101 and the second principal surface 102 as well as the first side surface 103 and the second side surface 104.

The second base electrode layer 132 is located on the second end surface 106 of the laminated body 110, and includes ends that extend on the first principal surface 101 and the second principal surface 102 as well as the first side surface 103 and the second side surface 104.

The first base electrode layer 122 and the second base electrode layer 132 are formed by, for example, applying a conductive paste including a conductive metal and a glass component, and baking the paste. For example, Cu, Ni, Ag, Pd, an Ag—Pd alloy, Au, or the like is included as the conductive metal for the first base electrode layer 122 and the second base electrode layer 132. For example, glass including B, Si, Ba, Mg, Al, Li, or the like is included as the glass component for the first base electrode layer 122 and the second base electrode layer 132.

The first base electrode layer 122 and the second base electrode layer 132 are provided by co-firing with the internal electrodes, or provided by applying a conductive paste to the surface of the fired laminated body 110, and baking the paste. The first base electrode layer 122 and the second base electrode layer 132 are each preferably about 10 μm or more and about 50 μm or less in the thickness of the thickest portion, for example.

The first plating layer 123 covers the first organic layer 140 located on the first base electrode layer 122. Specifically, the first plating layer 123 is preferably located on the first organic layer 140 located on the first end surface 105 of the laminated body 110 and extended therefrom to the first organic layer 140 located on the first principal surface 101, the second principal surface 102, the first side surface 103, and the second side surface 104 of the laminated body 110, for example.

The second plating layer 133 covers the second organic layer 150 located on the second base electrode layer 132. Specifically, the second plating layer 133 is preferably located on the second organic layer 150 located over the second end surface 106 of the laminated body 110 and extended therefrom to the second organic layer 150 located on the first principal surface 101, the second principal surface 102, the first side surface 103, and the second side surface 104 of the laminated body 110, for example.

The first plating layer 123 and the second plating layer 133 include, for example, at least one selected from Cu, Ni, Ag, Pd, Ag—Pd alloy, Au, Sn, and the like.

The first plating layer 123 may include multiple layers, for example, and preferably includes a two-layer structure of a Ni plating layer 124 and a Sn plating layer 126. The second plating layer 133 may include multiple layers, for example, and preferably includes a two-layer structure of a Ni plating layer 134 and a Sn plating layer 136. The plating layer is preferably about 1 μm or more and about 15 μm or less in thickness per layer, for example.

The Ni plating layer 124 of the first plating layer 123 covers the first organic layer 140 that covers the surface of the first base electrode layer 122 of the first external electrode 120. Thus, the first organic layer 140 and the first base electrode layer 122 are able to be prevented from being eroded by a solder in mounting the multilayer ceramic capacitor 100.

The Ni plating layer 134 of the second plating layer 133 covers the second organic layer 150 that covers the surface of the second base electrode layer 132 of the second external electrode 130. Thus, the second organic layer 150 and the second base electrode layer 132 are able to be prevented from being eroded by a solder in mounting the multilayer ceramic capacitor 100.

In addition, the Sn plating layer 126 is further included on the Ni plating layer 124 for the first external electrode 120, thus significantly improving the solderability of the first external electrode 120. The Sn plating layer 136 is further included on the Ni plating layer 134 for the second external electrode 130, thus significantly improving the solderability of the second external electrode 130. As a result, the multilayer ceramic capacitor 100 is able to be easily mounted.

The first organic layer 140 covers the first base electrode layer 122 and is extended therefrom to cover the surface of the laminated body 110. More specifically, the first organic layer 140 covers an end 220 of the first base electrode layer 122. The portion of the first organic layer 140 in contact with the laminated body 110 is located closer to the first end surface 105 of the laminated body 110, and located on the first principal surface 101, the second principal surface 102, the first side surface 103, and the second side surface 104 to wrap around the surface of the laminated body 110. One end 140a of the portion of the first organic layer 140 in contact with the laminated body 110 makes contact to cover the end 220 of the first base electrode layer 122 of the first external electrode 120. The portion of the first organic layer 140 in contact with the laminated body 110 extends from the end 220 of the first base electrode layer 122 even to at least a portion of the surface of the laminated body 110, and the other end 140b is located closer to the second end surface 106 than the end 230 of the first plating layer 123 and exposed. Furthermore, the end 230 of the first plating layer 123 of the first external electrode 120 preferably makes contact with the surface of one end 140a of the portion of the first organic layer 140 in contact with the laminated body 110, for example.

The second organic layer 150 covers the second base electrode layer 132 and extended therefrom, to cover the surface of the laminated body 110. More specifically, the second organic layer 150 covers the end 320 of the second base electrode layer 132. The portion of the second organic layer 150 in contact with the laminated body 110 is located closer to the second end surface 106 of the laminated body 110, and located on the first principal surface 101, the second principal surface 102, the first side surface 103, and the second side surface 104 to wrap around the surface of the laminated body 110. One end 150a the portion of the second organic layer 150 in contact with the laminated body 110 makes contact to cover the end 320 of the second base electrode layer 132 of the second external electrode 130. The portion of the second organic layer 150 in contact with the laminated body 110 extends from the end 320 of the second base electrode layer 132 even to at least a portion of the surface of the laminated body 110, and the other end 150b is located closer to the first end surface 105 than the end 330 of the second plating layer 133 and exposed. Furthermore, the end 330 of the second plating layer 133 of the second external electrode 130 preferably makes contact with the surface of one end 150a of the portion of the second organic layer 150 in contact with the laminated body 110, for example.

In accordance with the foregoing features, if a substrate is warped by a thermal shock or the like with the multilayer ceramic capacitor 100 mounted on the substrate, a stress based on the warp is able to cause delamination between the first base electrode layer 122 and the first plating layer 123 of the first external electrode 120 and delamination between the second base electrode layer 132 and the second plating layer 133 of the second external electrode 130. Therefore, the stress is dispersed, thus making it possible to significantly reduce or prevent cracking, deformation, or the like of the ceramic portion and the internal electrode portion of the multilayer ceramic capacitor 100. As a result, the reliability of the multilayer ceramic capacitor 100 is able to be significantly improved. In this regard, the crack is defined as cracking which develops from the outer layer portion toward the internal electrode layer portion with an external electrode end as a starting point.

As shown in FIG. 3, a portion of the first organic layer 140 in contact with the laminated body 110 preferably has a dimension $d_1$ (that is, a dimension in the length direction L from a leading end 222 of the first base electrode layer 122 to a leading end 142 of the first organic layer 140 closer to the second end surface 106) of about 5 µm or more and about 100 µm or less in the length direction L, for example. It is to be noted that the second organic layer 150 preferably includes the same or similar dimensions, for example. Thus, delamination is able to be reliably achieved between the base electrode layers and the plating layers without decreasing solderability.

The portion of the first organic layer 140, located on the laminated body 110, is preferably larger in thickness than the portion of the first organic layer 140 located on the first base electrode layer 122, for example. Thus, delamination is able to be reliably achieved between the first base electrode layer 122 and the first plating layer 123, because a difference in adhesion force is able to be produced at the boundary between the portion of the first organic layer 140 located on the laminated body 110 and the portion of the first organic layer 140 located on the first base electrode layer 122. The portion of the second organic layer 150, located on the laminated body 110, is preferably larger in thickness than the portion of the second organic layer 150 located on the second base electrode layer 132, for example. Thus, delamination is able to be reliably achieved between the second base electrode layer 132 and the second plating layer 133. The portions of the first organic layer 140 and the second organic layer 150, located on the first principal surface 101 and the second principal surface 102 of the laminated body 110, are preferably about 5 nm or more and about 100 nm or less in thickness, for example. In addition, the portion of the first organic layer 140 in the location of a leading end of the first base electrode layer 122 and the portion of the second organic layer 150 in the location of a leading end of the second base electrode layer 132 are preferably each about 5 nm or more and about 500 nm or less in thickness, for example. Thus, cracking, deformation, or the like of the laminated body 110 are able to be significantly reduced or prevented, and also defective plating as well as deviations of the multilayer ceramic capacitor 100 are able to be significantly reduced or prevented.

In addition, the first organic layer 140 on the end 220 of the first base electrode layer 122 (the portion in the location of the leading end) and the first organic layer 150 on the end 320 of the second base electrode layer 132 (the portion in the location of the leading end) are each about 5 nm or more and about 500 nm or less in thickness, for example.

The thickness of the first organic layer 140 on the end 220 of the first base electrode layer 122 (the portion in the location of a leading end) is measured as follows.

The thickness of the first organic layer 140 is able to be measured by performing cross-section polishing to the length at ½W (located at half the width W) of the multilayer ceramic capacitor 100 to be parallel or substantially parallel to the length direction L of the multilayer ceramic capacitor 100 (that is, parallel or substantially parallel to the LT surface), and in the cross section shown in FIG. 4, applying FIB (focused ion beam) processing to the leading end of the first external electrode 120 or the second external electrode 130, and observing the processed leading portion at 100000-fold magnification with a STEM (scanning transmission electron microscope).

It is to be noted that, for example, for the thickness of a portion of the first organic layer 140 shown in FIG. 4 in the location of a leading end of the first base electrode layer 122, the area of the first organic layer 140 is determined for an interval $d_3$ that includes the same or similar length as the thickness $d_2$ of the Ni plating layer 124 from the leading end 222 of the first base electrode layer 122, and the average thickness for the interval $d_3$ is regarded as the thickness of the first organic layer 140 on the end 220 (the portion in the location of the leading end).

In addition, the second organic layer 150 on the end 320 of the second base electrode layer 132 (the portion in the location of a leading end) is able to be also measured.

The first organic layer 140 and the second organic layer 150 include an organic silicon compound. For example, decyltrimethoxysilane, n-propyltrimethoxysilane, octyltriethoxysilane, or the like is included as the organic silicon compound. In particular, the inclusion of two types of: a monofunctional alkoxysilane structure and a multifunctional alkoxysilane Si—$(C_nH_{2n+1})_3$ structure, as the first organic layer 140 and the second organic layer 150 are able to cause the portion of the first organic layer 140 in the location of the leading end of the first base electrode layer 122 and the portion of the second organic layer 150 in the location of the leading end of the first base electrode layer 132 to differ in thickness from the portion other than the portion in the location of the leading end of the first base electrode layer 122 and the portion other than the portion in the location of the leading end of the second base electrode layer 132. It is to be noted that an organic silicon compound that includes a structure of multifunctional alkoxysilane Si—$(C_nH_{2n+1})_3$ and includes an N element may be included as the first organic layer 140 and the second organic layer 150.

Thus, if a substrate is warped by a thermal shock or the like with the multilayer ceramic capacitor 100 mounted on the substrate, a stress based on the warp is able to cause delamination between the first base electrode layer 122 and the first plating layer 123 of the first external electrode 120, and delamination between the second base electrode layer 132 and the second plating layer 133 of the second external electrode 130. Therefore, the stress is dispersed, thus making it possible to significantly reduce or prevent cracking, deformation, or the like of the ceramic portion and the internal electrode portion of the multilayer ceramic capacitor 100. As a result, the reliability of the multilayer ceramic capacitor 100 is able to be significantly improved.

In addition, there is a portion without any organic layer between the first external electrode 120 and the second external electrode 130 of the multilayer ceramic capacitor 100. Thus, because the surface of the laminated body 110 is exposed, the fixing strength with a conductive adhesive for use in mounting is significantly improved, thus making it possible to significantly reduce or prevent a decrease in the mounting reliability.

In addition, the adhesion strength between the first base electrode layer 122 of the first external electrode 120 and the laminated body 110 is preferably higher than the adhesion strength between the first organic layer 140 and the first plating layer 123 of the first external electrode 120. The adhesion strength between the second base electrode layer 132 of the second external electrode 130 and the laminated body 110 is preferably higher than the adhesion strength between the second organic layer 150 and the second plating layer 133 of the second external electrode 130.

In addition, the adhesion strength between the laminated body 110 and the first organic layer 140 is preferably higher than the adhesion strength between the first organic layer 140 and the first plating layer 123. The adhesion strength between the laminated body 110 and the second organic layer 150 is preferably higher than the adhesion strength between the second organic layer 150 and the second plating layer 133.

The atomic concentration ratios of Si to Cu are preferably about 1% or more and about 5% or less at the surfaces of the first organic layer 140 and the second organic layer 150, for example. Thus, not only is cracking, deformation, or the like of the ceramic portion and the internal electrode portion of the multilayer ceramic capacitor 100 able to be significantly reduced or preventing, but also defective plating as well as deviations of the multilayer ceramic capacitor 100 are able to be significantly reduced or prevented.

In addition, the relational expression of A>B is preferably satisfied when the atomic concentration ratio of Si to Cu is denoted by B in the first organic layer 140 located on the first base electrode layer 122 located on the first end surface 105, the atomic concentration ratio of Si to Cu is denoted by A in the first organic layer 140 located on the first base electrode layer 122 located on the first principal surface 101 and the second principal surface 102, and the atomic concentration ratio of Si to Cu is denoted by A in the first organic layer 140 located directly on the first principal surface 101 and the second principal surface 102. The relational expression of A>B is preferably satisfied when the atomic concentration ratio of Si to Cu is denoted by B in the second organic layer 150 located on the second base electrode layer 132 located on the second end surface 106, the atomic concentration ratio of Si to Cu is denoted by A in the second organic layer 150 located on the second base electrode layer 132 located on the first principal surface 101 and the second principal surface 102, and the atomic concentration ratio of Si to Cu is denoted by A in the second organic layer 150 located directly on the first principal surface 101 and the second principal surface 102. Thus, delamination of the first organic layer 140 and the second organic layer 150 is able to be stopped by the first side surface 103 and the second side surface 104, thus significantly reducing or preventing a decrease in reliability.

Further, the atomic concentration ratio of Si to Cu in the first organic layer 140 located on the first base electrode layer 122 located on the first side surface 103 and the second side surface 104 and the atomic concentration ratio of Si to Cu in the first organic layer 140 located directly on the first side surface 103 and the second side surface 104 preferably have the same or similar value as A, and preferably satisfy the relational expression of A>B.

The atomic concentration ratios mentioned above are measured by XPS (X-ray photoelectron spectroscopy). More specifically, the atomic concentration ratios are able to be provided by making a cut on the order of a about 150 μm square at central portions of the chip side surface and the end surface, peeling the first plating layer 123 or the second plating layer 133 at the cut portions, applying an XPS (X-ray photoelectron spectroscopy) analysis to the surfaces, and calculating the atomic concentration ratios on the basis of the respective peak areas of Cu2p and Si2p and the sensitivity coefficient of the measurement system. In addition, measurement conditions for the XPS are provided below.
 System Name: VersaProbe from ULVAC-PHI
 X-Ray: monochromatic Al—Kα Ray
 X-Ray Diameter: about 100 μm in Half-Power Beamwidth
 Takeoff Angle of Photoelectron: about 45°
 Measured Spectra: Si2p, Cu2p
 Compensation Method for Charging during Measurement: Irradiation with Electron Beams and Ion beams The multilayer ceramic electronic component 100 according to the present preferred embodiment significantly reduces or prevents cracking of the laminated body 110, and also significantly reduces or prevents defective plating as well as deviations of the multilayer ceramic capacitor 100, since the first organic layer 140 on the end 220 of the first base electrode layer 122 (the portion in the location of the leading end) and the first organic layer 150 on the end 320 of the second base electrode layer 132 (the portion in the location of the leading end) are each about 5 nm or more and about 500 nm or less in thickness, for example. In this regard, the crack is defined as cracking which develops from the outer layer portion toward the internal electrode layer portion with an external electrode end as a starting point.

In addition, in the multilayer ceramic capacitor 100 according to the present preferred embodiment, the adhesion strength between the first base electrode layer 122 of the first external electrode 120 and the laminated body 110 is preferably higher than the adhesion strength between the first organic layer 140 and the first plating layer 123 of the first external electrode 120, for example. The adhesion strength between the second base electrode layer 132 of the second external electrode 130 and the laminated body 110 is preferably higher than the adhesion strength between the second organic layer 150 and the second plating layer 133 of the second external electrode 130, for example. Thus, delamination is able to be achieved, respectively, between the first organic layer 140 and the second organic layer 150, and between the first plating layer 123 and the second plating layer 133, and the adhesion is able to be maintained between the laminated body 110 and the first organic layer 140, and between the laminated body 110 and the second organic layer 150, and ingress of water and the like is able to be thus significantly reduced or prevented. Therefore, defects are able to be further significantly reduced or prevented, and the reliability of the multilayer ceramic capacitor 100 is able to be significantly improved.

Furthermore, in the multilayer ceramic capacitor 100 according to the present preferred embodiment, the adhesion strength between the laminated body 110 and the first organic layer 140 is preferably higher than the adhesion strength between the first organic layer 140 and the first plating layer 123. The adhesion strength between the laminated body 110 and the second organic layer 150 is preferably higher than the adhesion strength between the second organic layer 150 and the second plating layer 133. Thus, if a substrate is warped by a thermal shock or the like with the multilayer ceramic capacitor 100 mounted on the substrate, a stress due to the warp is able to cause delamination between the first base electrode layer 122 and the first plating layer 123 of the first external electrode 120, and delamination between the second base electrode layer 132 and the second plating layer 133 of the second external electrode 130. Therefore, the stress is further dispersed, thus making it possible to significantly reduce or prevent cracking, deformation, or the like of the ceramic portion and the internal electrode portion of the multilayer ceramic capacitor 100 further. As a result, the reliability of the multilayer ceramic capacitor 100 is able to be further significantly improved.

In addition, in the multilayer ceramic capacitor 100 according to the present preferred embodiment, an organic silicon compound that includes a structure of multifunctional alkoxysilane Si—$(C_nH_{2n+1})_3$ and includes an N element is preferably included as the first organic layer 140 and the second organic layer 150, for example. Thus, since the layers are reliably provided on the surfaces of the laminated body 110, the first base electrode layer 122 of the first external electrode 120, and the like, the actions of the first organic layer 140 and the second organic layer 150 effectively keep the laminated body 110 from being cracked, thus significantly improving the reliability.

Next, a method for manufacturing the multilayer ceramic capacitor 100 according to a preferred embodiment of the present invention will be described.

First, the laminated body 110 is prepared, which includes the first internal electrodes 211 and the second internal electrodes 212. Specifically, a ceramic paste including a ceramic powder is applied as a sheet, for example, by a screen printing method, and dried, thus preparing mother ceramic green sheets.

Next, onto the mother ceramic green sheets, a conductive paste for internal electrodes is applied in a predetermined pattern, for example, by screen printing or the like, thus defining conductive patterns of internal electrodes as the first internal electrodes 211. Onto others of the mother ceramic green sheets, a conductive paste for internal electrodes is applied in a predetermined pattern, for example, by screen printing or the like, thus defining conductive patterns of internal electrodes as the second internal electrodes 212.

In this way, prepared are: the mother ceramic green sheets with the conductive patterns of internal electrodes as the first internal electrodes 211; the mother ceramic green sheets with the conductive patterns of internal electrodes as the second internal electrodes 212; and the mother ceramic green sheets without any conductive pattern for internal electrodes. It is to be noted that the ceramic paste and the conductive paste for the internal electrodes may include, for example, known binders and solvents.

Next, a mother stacked body is prepared. The mother stacked body is prepared as follows. The mother ceramic green sheets for outer layers without any conductive pattern printing for the internal electrodes are stacked to reach a predetermined number of sheets, and the mother ceramic green sheets with the conductive pattern printing for the internal electrodes as the first internal electrodes 211 and the mother ceramic green sheets with the conductive pattern printing for internal electrodes as the second internal electrodes 212 are sequentially and alternately stacked thereon. The mother ceramic green sheets for outer layers without any conductive pattern printing for internal electrodes are further stacked thereon to reach a predetermined number of sheets, thus preparing the mother stacked body. The mother stacked body may be, if desired, subjected to pressing in the stacking direction by, for example, isostatic pressing.

Next, the mother stacked body is cut in predetermined positions, thus cutting out a plurality of raw laminated bodies 110 of a predetermined size. In this regard, the raw laminated bodies 110 may include corners and ridges rounded by barrel polishing or the like.

Next, the raw laminated bodies 110 are subjected to firing, thus providing laminated bodies 110 provided therein with first internal electrodes 211 and second internal electrodes 212, where the first internal electrodes 211 include first extended portions 211b exposed at first end surfaces 105, and the second internal electrodes 212 include second extended portions 212b exposed at second end surfaces 106. The firing temperature is set appropriately depending on the types of the ceramic material and the conductive material, and for example, set within the range of about 900° C. or higher and about 1300° C. or lower, for example.

Next, base electrode layers for external electrodes are defined on both ends of the fired laminated body 110. A conductive paste for external electrodes is applied to the both ends of the fired laminated body 110, and subjected to baking, thus defining the first base electrode layer 122 for the first external electrode 120 and the second base electrode layer 132 for the second external electrode 130. The baking temperature is preferably about 700° C. or higher and about 900° C. or lower, for example.

Next, the first organic layer 140 and the second organic layer 150 are formed. The first organic layer 140 and the second organic layer 150 are prepared as follows.

The first organic layer 140 and the second organic layer 150 are formed through the application of or immersion in an organic process liquid to cover predetermined surfaces of the first base electrode layer 122 for the first external electrode 120, of the second base electrode layer 132 for the second external electrode 130, and of the laminated body 110. In the step of forming the first organic layer 140 and the second organic layer 150, the organic process liquid is applied in two batches.

Specifically, the laminated bodies 110 with the baked first base electrode layers 122 and the second base electrode layers 132 respectively for the first external electrodes 120 and the second external electrodes 130 are arranged in the longitudinal direction, and the surfaces of the first external electrodes 120 and the second external electrodes 130 are immersed in the first organic process liquid to leave the ends 220 covered by the first organic layers 140 and the ends 320 covered by the second organic layers 150. Thereafter, the laminated body 110 is dried at a temperature of about 100° C. or higher and about 200° C. or lower, for example, thus defining the portion of the first organic layer 140 covering the first base electrode layer 122 and the portion of the second organic layer 150 covering the second base electrode layer 132 respectively on the surfaces of the first external electrode 120 and the second external electrode 130 to leave the end 220 covered by the first organic layer 140 and the end 320 covered by the second organic layer 150. The first organic process liquid includes a monofunctional silane coupling material, specifically with the use of decyltrimethoxysilane, n-propyltrimethoxysilane, octyltriethoxysilane, or the like, and provided by diluting the organic process liquid with an alcohol solvent to about 3 weight % or less.

Next, for the laminated body 110, predetermined surfaces of the first base electrode layer 122 for the first external electrode 120, of the second base electrode layer 132 for the second external electrode 130, and of the laminated body 110 are immersed in the second organic process liquid. In this regard, the organic film formed by the second organic process liquid is less likely to be included on the organic film defined by the first organic process liquid, and thus included on the predetermined surfaces of the end 220 of the first base electrode layer 122, of the end 320 of the second base electrode layer 132, and of the laminated body 110. Thereafter, the laminated body 110 is dried at a temperature of about 100° C. or higher and about 200° C. or lower, for example, thus forming the first organic layer 140 and the second organic layer 150 to cover the end 220 of the first base electrode layer 122 and the end 320 of the second base electrode layer 132. The second organic process liquid is, with the inclusion of multifunctional alkoxysilane Si—$(C_nH_{2n+1})_3$, provided by diluting the organic process liquid with an alcohol solvent to about 1 weight % or more and about 10 weight % or less. The first organic process liquid and the second organic process liquid preferably each includes an organic silicon compound.

Because the first organic process liquid is different from the second organic process liquid, the first organic layer 140 and the second organic layer 150 are formed from the first liquid on the surfaces of the first base electrode layer 122 and the second base electrode layer 132 to leave the end 220 and the end 320. Then, the second liquid is less likely to adhere onto the first organic layer 140 and the second organic layer 150 formed the first time, thus allowing the first organic layer 140 and the second organic layer 150 to be formed to increase in thickness. As a result, it becomes possible to form the first organic layer 140 on the end 220 of the first base electrode layer 122 of the first external electrode 120, which is a starting point for a crack, and it becomes possible to form the second organic layer 150 on the end 320 of the second base electrode layer 132 of the second external electrode 130, which is a starting point for a crack, thus significantly improving the reduction or prevention of cracking according to the preferred embodiments of the present invention.

Next, plating layers for external electrodes are formed on both ends of the laminated body 110. The first plating layer 123 for the first external electrode 120 is formed to cover almost all of the surface of the first base electrode layer 122 for the first external electrode 120, and the end surface of the end 230 of the first plating layer 123 is formed to cover the surface of one end 140a of the first organic layer 140. The second plating layer 133 for the second external electrode 130 is formed to cover almost all of the surface of the second base electrode layer 132 for the second external electrode 130, and the end surface of the end 330 of the second plating layer 133 is formed to cover the surface of one end 150a of the second organic layer 150.

Next, the first organic layer 140 and the second organic layer 150 may be partially removed, if desired.

The foregoing method is able to easily manufacture the multilayer ceramic capacitor 100 which is able to keep the ceramic portion and the internal electrode portion of the laminated body 110 from having any crack, deformation, or the like generated, thus significantly improving the performance and the reliability.

EXPERIMENTAL EXAMPLES

Experimental Example 1 and Experimental Example 2 will be described below to confirm the advantageous effects provided by the preferred embodiments of the present invention.

Experimental Example 1

In Experimental Example 1, the multilayer ceramic capacitor 100 was prepared by a manufacturing method according to the preferred embodiments described above, and subjected to thermal stress, and the crack generation rate and the defective plating rate were then measured.

The specifications of the multilayer ceramic capacitor 100 are provided below.
  Size: Length L: about 1.0 mm, Width W: about 0.5 mm, Height H: about 0.5 mm
  Ceramic Material: $BaTiO_3$
  Capacitance: about 10 nF
  Rated Voltage: about 16 V
The specifications of the first external electrode 120 and the second external electrode 130 are provided below.
  Base Electrode Layer: Material including Conductive Metal (Cu) and Glass Component
  Thickness of Base Electrode Layer: about 30 μm at Central Portion of End Surface
  Organic Layer
  Portion formed on Surface of Base Electrode Layer: Monofunctional Silane Coupling Film of Decyltrimethoxysilane, with Thickness of about 30 nm
  Portion formed on End of Base Electrode Layer and Surface of Laminated Body: Multifunctional Alkoxysilane $Si—(C_nH_{2n+1})_3$ of Tris-(Trimethoxysilylpropyl) Isocyanurate
  Thickness of Portion formed on End of Base Electrode Layer and Surface of Laminated Body: Ten Thicknesses: about 0 nm; about 3 nm; about 5 nm; about 10 nm; about 30 nm; about 100 nm; about 200 nm; about 500 nm; about 700 nm; and about 1000 nm (no second process for forming the organic layer in the case of about 0 nm) (It is to be noted that the thickness of the organic layer formed on the base electrode layer in the location of the leading end was prepared by adjusting the concentration of the organic process liquid as listed in Table 1.)
  Plating Layer: Two Layers of Ni Plating layer (about 3 μm)+Sn plating Layer (about 3 μm)

A test process is described below.

The multilayer ceramic capacitor 100 was mounted by applying an LF solder paste of about 150 μm in thickness to a JEITA-1 and FR4 substrate of about 1.6 mm in thickness, then placing the multilayer ceramic capacitor 100 thereon, and passing the substrate through a reflow furnace at about 240° C. five times. For comparison, conventional multilayer ceramic capacitors without the first organic layer 140 and the second organic layer 150 were also similarly mounted. The number of multilayer ceramic capacitors mounted is 100 for every type.

A process for measuring the crack generation rate is described below.

The mounted multilayer ceramic capacitors were placed on a hot plate at about 240° C. to melt the solder, thus removing the multilayer ceramic capacitor from the substrate. Next, cross-section polishing was carried out from the surface in a direction that intersects at right angles with the mounting surface of the substrate, that is, the first side surface or the second side surface to a central portion (located at half the width W) of the multilayer ceramic capacitor, and thereafter, the polished cross section was observed with an SEM (electron microscope), while focusing on a crack developed from the outer layer portion toward the internal electrode layer portion with an external electrode end as a starting point.

In a process for checking defective plating, the plated samples were observed with a metallograph (100-fold magnification), and the samples with the base electrode layers visible at an occupancy ratio of 5 about % or more were regarded as defective plating.

Table 1 shows therein the results of measurement in terms of the crack generation rate and of the defective plating rate.

TABLE 1

|  | Conventional Product | 0 nm | 3 nm | 5 nm | 10 nm | 30 nm | 100 nm | 300 nm | 500 nm | 700 nm | 1000 nm |
| --- | --- | --- | --- | --- | --- | --- | --- | --- | --- | --- | --- |
| Process Liquid Concentration | — | 0 weight % | 0.3 weight % | 1.0 weight % | 1.5 weight % | 2.0 weight % | 4.0 weight % | 7.0 weight % | 10.0 weight % | 13.0 weight % | 17.0 weight % |
| Crack Generation Rate | 88% | 83% | 20% | 0% | 0% | 0% | 0% | 0% | 0% | 0% | 0% |
| Defective Plating | 0% | 0% | 0% | 0% | 0% | 0% | 0% | 0% | 0% | 10% | 50% |

Eighty three out of the hundred conventional multilayer ceramic capacitors without the first organic layer 140 and the second organic layer 150 were found to be cracked. In the case of the hundred multilayer ceramic capacitors 100 each including the first organic layer 140 and the second organic layer 150 where the organic layers defined on the base electrode layers in the locations of the leading ends were about 5 nm or more in thickness, none of the capacitors was found to be cracked. However, in the case of the multilayer ceramic capacitors 100 each including the first organic layer 140 and the second organic layer 150 where the organic layers defined on the base electrode layers in the locations of the leading ends were about 700 nm and about 1000 nm in thickness, defective plating was found.

In addition, the cracks, with the end 220 of the first external electrode 120 or the end 320 of the second external electrode 130 as a starting point, were all extended toward the first side surface 103 or the second side surface 104 of the laminated body 110 at an angle of about 45 degrees. The uncracked multilayer ceramic capacitors 100 each including the first organic layer 140 and the second organic layer 150 were examined closely by the SEM. Then, slight delamination was found between the first base electrode layer 122 and the Ni plating layer 123 of the first external electrode 120 and between the second base electrode layer 132 and the Ni plating layer 133 of the second external electrode 130.

Experimental Example 2

In Experimental Example 2, multilayer ceramic capacitors 100 in accordance with the same or similar specifications of the multilayer ceramic capacitors prepared in Experimental Example 1 were prepared by a manufacturing method according to the preferred embodiments described above, and subjected to thermal stress different from that in Experimental Example 1, and the crack generation rate and the deviation rate of the multilayer ceramic capacitor were then measured.

A test process is described below.

The multilayer ceramic capacitor 100 was mounted by applying an LF solder paste of about 150 μm in thickness to a JEITA-1 and FR4 substrate of about 1.6 mm in thickness, then placing the multilayer ceramic capacitor 100 thereon, and passing the substrate through a reflow furnace at about 240° C. once. For comparison, conventional multilayer ceramic capacitors without the first organic layer 140 and the second organic layer 150 were also similarly mounted. The number of multilayer ceramic capacitors mounted is 100 for every type.

The multilayer ceramic capacitors mounted by the process described above were subjected to a heat cycle test. As the heat cycle test, the multilayer ceramic capacitors were held at about −40° C. for about 30 minutes and then held at about 125° C. for about 30 minutes as one cycle, and 1000 cycles in total were carried out. The tested multilayer ceramic capacitors were placed on a hot plate at about 240° C. to melt the solder, thus removing the multilayer ceramic capacitor from the substrate. Next, cross-section polishing was carried out from the surface in a direction that intersects at right angles with the mounting surface of the substrate, that is, the first side surface or the second side surface to a central portion (located at half the width W) of the multilayer ceramic capacitor, and thereafter, the polished cross section was observed with an SEM (electron microscope), while focusing on a crack developed from the outer layer portion toward the internal electrode layer portion with an external electrode end as a starting point.

The deviation of the multilayer ceramic capacitor refers to a tombstone shape in a multiple reflow test, or a failure to achieve conduction on a solder-mounted substrate due to deviation from the substrate in a heat cycle test.

Table 2 shows therein the results of measurement in terms of the crack generation rate and of the deviation rate of the multilayer ceramic capacitor.

TABLE 2

|  | Conventional Product | 0 nm | 3 nm | 5 nm | 10 nm | 30 nm | 100 nm | 300 nm | 500 nm | 700 nm | 1000 nm |
| --- | --- | --- | --- | --- | --- | --- | --- | --- | --- | --- | --- |
| Process Liquid Concentration | — | 0 weight % | 0.3 weight % | 1.0 weight % | 1.5 weight % | 2.0 weight % | 4.0 weight % | 7.0 weight % | 10.0 weight % | 13.0 weight % | 17.0 weight % |
| Crack Generation Rate | 100% | 70% | 30% | 0% | 0% | 0% | 0% | 0% | 0% | 0% | 0% |
| Deviation Rate of Multilayer Ceramic Capacitor | 0% | 0% | 0% | 0% | 0% | 0% | 0% | 0% | 0% | 30% | 70% |

All of the hundred conventional multilayer ceramic capacitors without the first organic layer 140 and the second organic layer 150 were found to be cracked. In the case of the hundred multilayer ceramic capacitors 100 each including the first organic layer 140 and the second organic layer 150 where the organic layers provided on the base electrode layers in the locations of the leading ends were about 5 nm or more in thickness, none of the capacitors was found to be cracked.

However, in the case of the multilayer ceramic capacitors 100 including the first organic layer 140 and the second organic layer 150 where the organic layers defined on the base electrode layers in the locations of the leading ends were about 700 nm and about 1000 nm in thickness, the multilayer ceramic capacitors were found to undergo a deviation.

In addition, the cracks, with the end 220 of the first external electrode 120 or the end 320 of the second external electrode 130 as a starting point, were all extended toward the first side surface 103 or the second side surface 104 of the laminated body 110 at an angle of about 45 degrees. The uncracked multilayer ceramic capacitors 100 each including the first organic layer 140 and the second organic layer 150 were examined closely by the SEM. Then, slight delamination was found between the first base electrode layer 122 and the Ni plating layer 123 of the first external electrode 120 and between the second base electrode layer 132 and the Ni plating layer 133 of the second external electrode 130.

From the foregoing results, the features provided by the preferred embodiments of the present invention were confirmed successfully.

In the descriptions of the preferred embodiments of the present invention described above, various features or elements may be combined with each other. The preferred embodiments of the present invention disclosed herein should be considered by way of example in all respects, and non-limiting. The scope of the present invention is defined by the claims, but not by the foregoing descriptions, and intended to encompass all of modifications within the spirit and scope equivalent to the claims.

Figure 5:
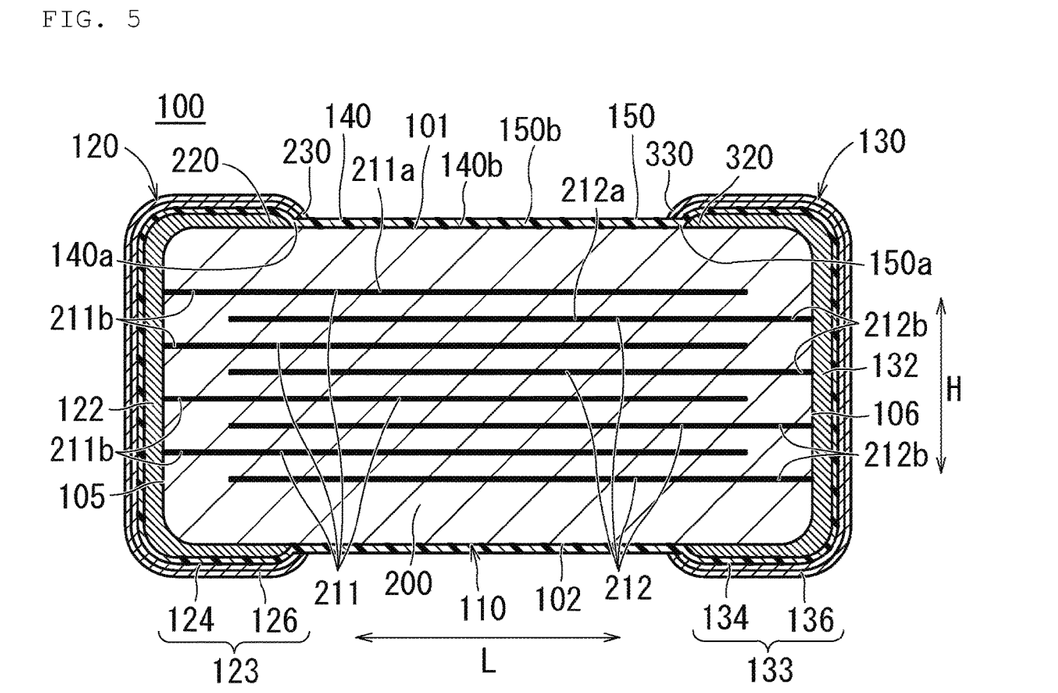
FIG. 5 is a cross-sectional view showing a modification example of a multilayer ceramic electronic component according to a preferred embodiment of the present invention.

For example, in the case of preferred embodiments of the present invention described above, there is a portion without any organic layer between the first external electrode 120 and the second external electrode 130 of the multilayer ceramic capacitor 100. However, as shown in FIG. 5, the organic layers may be located on the entire exposed surface of the laminated body 110 between the first external electrode 120 and the second external electrode 130, in such a way that the other end 140b of the first organic layer 140 extends to a central portion of the laminated body 110, and the other end 150b of the second organic layer 150 extends to the central portion of the laminated body 110, thus defining a joint at the central portion.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic electronic component comprising:
a laminated body including a plurality of laminated dielectric layers and a plurality of laminated internal electrodes, the laminated body including a first principal surface and a second principal surface opposite in a laminating direction, a first side surface and a second side surface opposite in a width direction perpendicular or substantially perpendicular to the laminating direction, and a first end surface and a second end surface opposite in a length direction perpendicular or substantially perpendicular to the laminating direction and the width direction;
a first external electrode electrically connected to the internal electrodes, and located on the first end surface, with an end extending on the first principal surface, the second principal surface, the first side surface, and the second side surface;
a second external electrode electrically connected to the internal electrodes, and located on the second end surface, with an end extending on the first principal surface, the second principal surface, the first side surface, and the second side surface; wherein
the first external electrode includes a first base electrode layer including a conductive metal and a glass component, a first organic layer including an organic silicon compound, covering the first base electrode layer, and a first plating layer located on the first organic layer;
the second external electrode includes a second base electrode layer including a conductive metal and a glass component, a second organic layer including an organic silicon compound, covering the second base electrode layer, and a second plating layer located on the second organic layer;
the first organic layer covers from the first base electrode layer to at least a portion of a surface of the laminated body, and the second organic layer covers from the second base electrode layer to at least a portion of a surface of the laminated body;
a leading end of the first plating layer extends beyond an end of the first base electrode in the length direction and is in contact with the first organic layer, with the first organic layer of about 5 nm or more and about 500 nm or less in thickness at an end of the first base electrode layer;
a leading end of the second plating layer extends beyond an end of the second base electrode in the length direction and is in contact with the second organic layer, with the second organic layer of about 5 nm or more and about 500 nm or less in thickness at an end of the second base electrode layer; and
an atomic concentration of Si to Cu is about 1% or more and about 5% or less between a Cu concentration and an Si concentration at surfaces of the first organic layer and of the second organic layer.

2. The multilayer ceramic electronic component according to claim 1, wherein
an adhesion strength between the laminated body and the first base electrode layer is higher than an adhesion strength between the first organic layer and the first plating layer; and
an adhesion strength between the laminated body and the second base electrode layer is higher than an adhesion strength between the second organic layer and the second plating layer.

3. The multilayer ceramic electronic component according to claim 1, wherein
an adhesion strength between the laminated body and the first organic layer is higher than an adhesion strength between the first organic layer and the first plating layer; and
an adhesion strength between the laminated body and the second organic layer is higher than an adhesion strength between the second organic layer and the second plating layer.

4. The multilayer ceramic electronic component according to claim 1, wherein the first organic layer and the second organic layer each includes an organic silicon compound that includes a structure of multifunctional alkoxysilane Si—$(C_nH_{2n+1})_3$, and includes an N element.

5. The multilayer ceramic electronic component according to claim 1, wherein the multilayer ceramic electronic component is a multilayer ceramic capacitor.

6. The multilayer ceramic electronic component according to claim 1, wherein the plurality of dielectric layers and the plurality of internal electrodes are laminated alternately.

7. The multilayer ceramic electronic component according to claim 1, wherein the plurality of internal electrodes include a plurality of first internal electrodes that each includes a rectangular or substantially rectangular first opposite portion, and a plurality of second internal electrodes that each includes a rectangular or substantially rectangular second opposite portion.

8. The multilayer ceramic electronic component according to claim 7, wherein the first opposite portion includes a first extended portion with an end surface exposed at the first end surface, and the second opposite portion includes a second extended portion with an end surface exposed at the second end surface.

9. The multilayer ceramic electronic component according to claim 7, wherein the first opposite portion and the second opposite portion generate an electrostatic capacitance.

10. The multilayer ceramic electronic component according to claim 1, wherein the first plating layer and the second plating layer each includes a two-layer structure.

11. The multilayer ceramic electronic component according to claim 10, wherein the two-layer structure of each of the first plating layer and the second plating layer includes a Ni layer and a Sn layer.

12. The multilayer ceramic electronic component according to claim 1, wherein the portion of the first organic layer that covers the portion of the surface of the laminated body is thicker than the portion of the first organic layer that covers the portion of the first base electrode layer, and the portion of the second organic layer that covers the portion of the surface of the laminated body is thicker than the portion of the second organic layer that covers the portion of the second base electrode layer.

13. The multilayer ceramic electronic component according to claim 1, wherein at least a portion of a space between the first external electrode and the second external electrode does not include any organic layer.

14. The multilayer ceramic electronic component according to claim 1, wherein the first organic layer covers an entire surface of the first base electrode layer, and the second organic layer covers an entire surface of the second base electrode layer.

15. The multilayer ceramic electronic component according to claim 1, wherein a joint between the first organic layer and the second organic layer is defined by one end of the first organic layer that extends to a central portion of the laminated body and one end of the second organic layer that extends to the central portion of the laminated body.

16. The multilayer ceramic electronic component according to claim 1, wherein
a thickness of the first organic layer at the end of the first base electrode layer in the length direction is different from a thickness of the first organic layer at a central portion of the first organic layer; and
a thickness of the second organic layer at the end of the second base electrode layer in the length direction is different from a thickness of the second organic layer at a central portion of the second organic layer.

* * * * *